(12) United States Patent
Muller et al.

(10) Patent No.: US 8,798,348 B2
(45) Date of Patent: Aug. 5, 2014

(54) METHOD FOR PROCESSING IMAGES OBTAINED BY TOMOSYNTHESIS AND ASSOCIATED DEVICE

(75) Inventors: Serge Muller, Guyancourt (FR); Sylvie Puong, Paris (FR)

(73) Assignee: General Electric Company, Schenectady, NY (US)

(*) Notice: Subject to any disclaimer, the term of this patent is extended or adjusted under 35 U.S.C. 154(b) by 1059 days.

(21) Appl. No.: 12/371,968

(22) Filed: Feb. 17, 2009

(65) Prior Publication Data

US 2009/0208085 A1   Aug. 20, 2009

(30) Foreign Application Priority Data

Feb. 19, 2008  (FR) .................................... 08 00896

(51) Int. Cl.
*G06K 9/00* (2006.01)

(52) U.S. Cl.
USPC ...................................................... 382/131

(58) Field of Classification Search
USPC .......................................... 382/128, 131, 132
See application file for complete search history.

(56) References Cited

U.S. PATENT DOCUMENTS

| | | | |
|---|---|---|---|
| 4,792,900 A | 12/1988 | Sones et al. | |
| 5,852,647 A | 12/1998 | Schick et al. | |
| 6,415,015 B2 | 7/2002 | Nicolas et al. | |
| 6,980,624 B2* | 12/2005 | Li et al. ........................... | 378/23 |
| 7,158,611 B2 | 1/2007 | Heismann et al. | |
| 2002/0003861 A1 | 1/2002 | Rick et al. | |
| 2002/0031475 A1 | 3/2002 | Speck et al. | |
| 2003/0194049 A1* | 10/2003 | Claus et al. ..................... | 378/22 |
| 2004/0131145 A1 | 7/2004 | Ohara | |
| 2006/0067473 A1* | 3/2006 | Eberhard et al. ............. | 378/98.9 |
| 2007/0286470 A1* | 12/2007 | Bernard et al. ............... | 382/132 |

FOREIGN PATENT DOCUMENTS

| | | |
|---|---|---|
| CA | 2561168 A1 | 10/2005 |
| EP | 0527592 A1 | 2/1993 |
| JP | S60-41952 A | 3/1985 |
| JP | S63-147437 A | 6/1988 |

(Continued)

OTHER PUBLICATIONS

Puong Syilvie et al.: "Dual-energy contrast enhanced digital breast tomosynsthesis: concept, method and evaluation on phantoms" Medical Imaging 2007: Physics of Medical Imaging, Editied by Jiang Hsieh and Michael J. Flynn—Proceedings of SPIE, vol. 6510, 2007, XP002497880 section 1.

(Continued)

*Primary Examiner* — Thanh Luu
*Assistant Examiner* — Danell L Owens
(74) *Attorney, Agent, or Firm* — Global Patent Operation; Marc A. Vivenzio

(57) ABSTRACT

A processing method for images obtained by tomosynthesis comprising acquisition of a plurality of 2D projection images of a region of interest of a patient; reconstruction of a 3D digital image from the acquired 2D projection images. An embodiment of the method is characterized in that it comprises: detection of an object in the reconstructed 3D image; estimation of a thickness limit characteristic of a contrast default of the voxels for a diameter of the object; estimation of the thickness of the object; comparison of the thickness of the object to the thickness limit; and in that if the thickness of the object is less than the thickness limit, the method further comprises application at least to the voxels of the object in the reconstructed image of a multiplicative corrective factor equal to the ratio between the thickness limit and the thickness of the object.

6 Claims, 3 Drawing Sheets

(56) References Cited

FOREIGN PATENT DOCUMENTS

| JP | 2002-504843 A | 2/2002 |
|---|---|---|
| JP | 2002-218322 A | 8/2002 |
| JP | 2004-208752 A | 7/2004 |
| JP | 2005-501684 A | 1/2005 |
| WO | WO2004008967 | 1/2004 |

OTHER PUBLICATIONS

Wheeler F.W. et al.: "Micro-Calcification Detection in Digital Tomosynthesis Mammography" Medical Imaging 2006: Image Processing, Edited by Joseph M. Reinhardt, Josien P.W. Pluim, Proceedings of SPIE vol. 6144, (Feb. 13, 2006), pp. 614420-1-614420-12, XP002497881 section 7.

Dobbins JT et al: "Digital x-ray tomosynthesis: current state of the art and clinical potential" Physics in Medicine and Biology, Taylor and Francis Ltd. London, GB, vol. 48, No. 19, 7 (Oct. 7, 2003), pp. R65-R106, XP002277335 ISSN: 0031-9155.

Bornefalk, Hans et al. Improved Dual-Energy Contrast Imaging Using an Energy Sensitive Photon Counting Detector and Spectrum-Splitting, RSNA Published Abstract, Nov. 30, 2005.

Lewin, J.M. MD, et al. "Dual-Energy Contrast-enhanced Digital Subtraction Mammography: Feasibility", Dept of Radiology University of Colorado Health Services, Denver, vol. 229, Oct. 2003, pp. 261-268.

Search Report from GB Application No. 0724746.3, dated Aug. 8, 2008.

Skarpathiotakis, M. et al., "Development of contrast digital mammography", Medical Physics, vol. 29, No. 10, Oct. 2002, pp. 2419-2426.

USPTO Final Rejection from U.S. Appl. No. 11/619,804 dated Apr. 13, 2010.

USPTO Non Final Rejection from U.S. Appl. No. 11/619,804 dated Aug. 26, 2009.

Unofficial translation of JP Notice of Allowance for JP Application No. 2007-338684 dated Aug. 27, 2013.

Unofficial translation of French Search Report and Written Opinion from FR Application No. 0800896 dated Oct. 8, 2008.

GB Official Action from GB Patent Application No. 0724746.3 dated Dec. 21, 2011.

GB Official Action from GB Patent Application No. 0724746.3 dated Mar. 14, 2011.

GB Search Report from GB Patent Application No. 0724746.3 dated Apr. 2, 2008.

Puong, et al. "Optimization of beam parameters and iodine quantification in dual-energy contrast enhanced digital breast tomosynthesis", SPIE 6913, Medical Imaging 2008: Physics of Medical Imaging, 69130Z, Mar. 18, 2008.

\* cited by examiner

METHOD FOR PROCESSING IMAGES OBTAINED BY TOMOSYNTHESIS AND ASSOCIATED DEVICE

CROSS-REFERENCE TO RELATED APPLICATIONS

This application claims priority under 35 U.S.C. §119(a)-(d) or (f) to prior-filed, co-pending French patent application Ser. No. 08/00896, filed on Feb. 19, 2008, which is hereby incorporated by reference in its entirety.

STATEMENT REGARDING FEDERALLY SPONSORED RESEARCH OR DEVELOPMENT

Not Applicable

NAMES OF PARTIES TO A JOINT RESEARCH AGREEMENT

Not Applicable

REFERENCE TO A SEQUENCE LISTING, A TABLE, OR COMPUTER PROGRAM LISTING APPENDIX SUBMITTED ON COMPACT DISC

Not Applicable

BACKGROUND OF THE INVENTION

1. Field of the Invention

The field of the invention relates to a medical imaging method of tomosynthesis. In particular, it relates to a method for processing images obtained by tomosynthesis to improve the quality of the images necessary for a radiologist to develop a diagnosis.

2. Description of Related Art

Tomosynthesis is a medical imaging modality whereof the essential principles are listed hereinbelow and illustrated in FIG. 1.

FIG. 1 schematically illustrates the acquisition of 2D images of the organ and reconstruction of a 3D image of this organ by tomosynthesis.

X-rays, R, originating from a source S are emitted according to different angulations $(1, \ldots, i, \ldots, n)$ to the organ O. After passing through the organ, they are detected by the detector Det forming a set of projection images $(Ai, \ldots, Ai, \ldots, An)$. It should be noted that there are as many 2D images acquired as angulations considered.

In single-energy tomosynthesis the basis of the 2D images is supposed to be locally uniform around the lesion of interest.

In the case of dual-energy tomosynthesis it is evident that two images are acquired with two different energy spectra for each angulation considered and that a contrast medium has been earlier injected in the patient.

The acquisition is executed by a detector Det situated opposite a source of X-rays, for example a digital camera or a solid detector based on amorphous silicon or amorphous selenium.

Application of tomosynthesis is detection and characterisation of a lesion in an organ, for example a cancerous lesion.

In a tomosynthesis embodiment the 2D projection images are utilised to reconstruct a 3D image, and the radiologist interprets this image as a function of the differences in contrast observed.

The reconstructed volume (VR) contains a plurality of voxels quantifying the attenuation of X-rays by matter encountered.

In the case of an organ exhibiting a lesion it presents attenuation different to the organ.

The result on the 3D image is a contrast difference for detecting the lesion.

However, an intrinsic problem to tomosynthesis is the limited angular opening of the acquisition of projection images which causes in particular limited resolution according to the dimension perpendicular to the plane of the detector. Here the plane of the detector is according to the x, y axes of an orthonormal marker and the perpendicular dimension is according to the z axis of this same marker.

Poor resolution in the z dimension perpendicular to the plane of the detector is due to the limited angular opening covered by the X-ray tube in comparison to tomography.

In fact, to obtain isotropic resolution (identical according to all dimensions) a set of projection images right around the organ would have to be acquired continuously. Yet it is understood that this is practically impossible for tomosynthesis examination.

Methods are known for improving the resolution of images acquired for discriminating nearby elements.

But apart from this problem, beyond a certain thickness of a lesion (taken along the z axis), the value of the voxels making up this lesion in an image plane passing through the lesion in the reconstructed volume is not sufficient for improved identification of the type of lesion by the radiologist (benign or malignant lesion).

The effect of this is to introduce uncertainty to the characterisation of the lesion, which can obviously compromise diagnosis.

In other terms the reconstructed image is reliable only for lesions having minimal thickness relative to their size according to a plane which is parallel to the detector and which passes through the object.

BRIEF SUMMARY OF THE INVENTION

Embodiments of the invention improve the images obtained by tomosynthesis and especially those obtained by emission of X-rays with injection of contrast medium.

And more particularly, an embodiment of the invention overcomes the lack of the contrast due to the limited angular opening characterising the path of the source of X-rays around the zone of interest during acquisition of 2D projection images in tomosynthesis.

In particular, it prevents the value of the voxels of the 3D image from being degraded when the thickness of the object to be characterised is less than a thickness limit for a given size of object measured in a plane which is parallel to the detector and which passes through the object.

An embodiment of the invention in fact overcomes this limit to obtain 3D images containing voxels precisely by quantifying the radio-opacity of the zone of interest.

Thus, according to a first aspect, an embodiment of the invention relates to a method for processing images obtained by tomosynthesis comprising acquisition of a plurality of 2D projection images of a region of interest of a patient; reconstruction of a 3D digital image from the acquired 2D projection images.

An embodiment of a method is characterised in that it comprises: detection of an object in the reconstructed 3D image; estimation of a thickness limit characteristic of a lack of the contrast of the voxels for a diameter of the object; estimation of the thickness of the object; comparison of the thickness of the object to the thickness limit; and in that if the thickness of the object is less than the thickness limit, the method further comprises application at least to the voxels of the object in the reconstructed image of a multiplicative corrective factor equal to the ratio between the thickness limit and the thickness of the object.

An embodiment of the method therefore produces a 3D image of the organ containing the object to be characterised whereof the voxels are proportional to the physical size characteristic of the radio-opacity of the object.

According to a second aspect, an embodiment of the invention relates to a medical imaging system comprising means for a method embodiment according to the first aspect of the invention.

And according to a third aspect, an embodiment of the invention relates to a computer program, characterised in that it comprises machine instructions for using a method according to the first aspect of the invention.

BRIEF DESCRIPTION OF THE FIGURES

Other characteristics and advantages of embodiments of the invention will emerge from the following description which is purely illustrative and non-limiting and must be read in conjunction with the attached drawings, in which.

DETAILED DESCRIPTION OF THE INVENTION

Medical Imaging System

Figure 2:
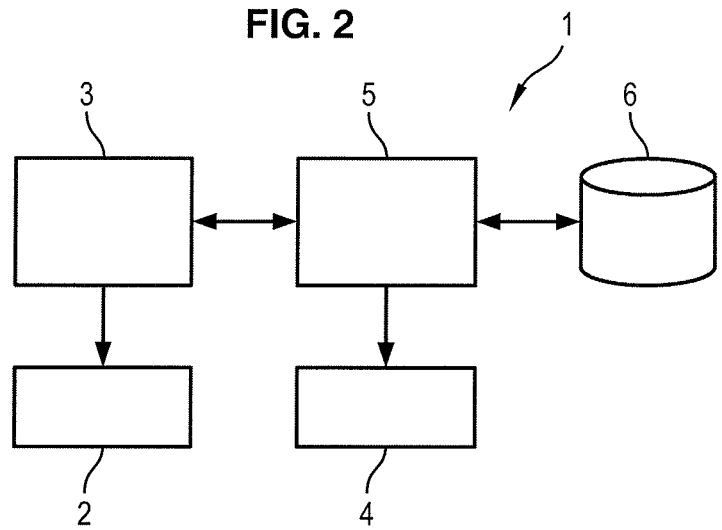
FIG. 2 schematically illustrates a medical imaging system.
Figure 1:
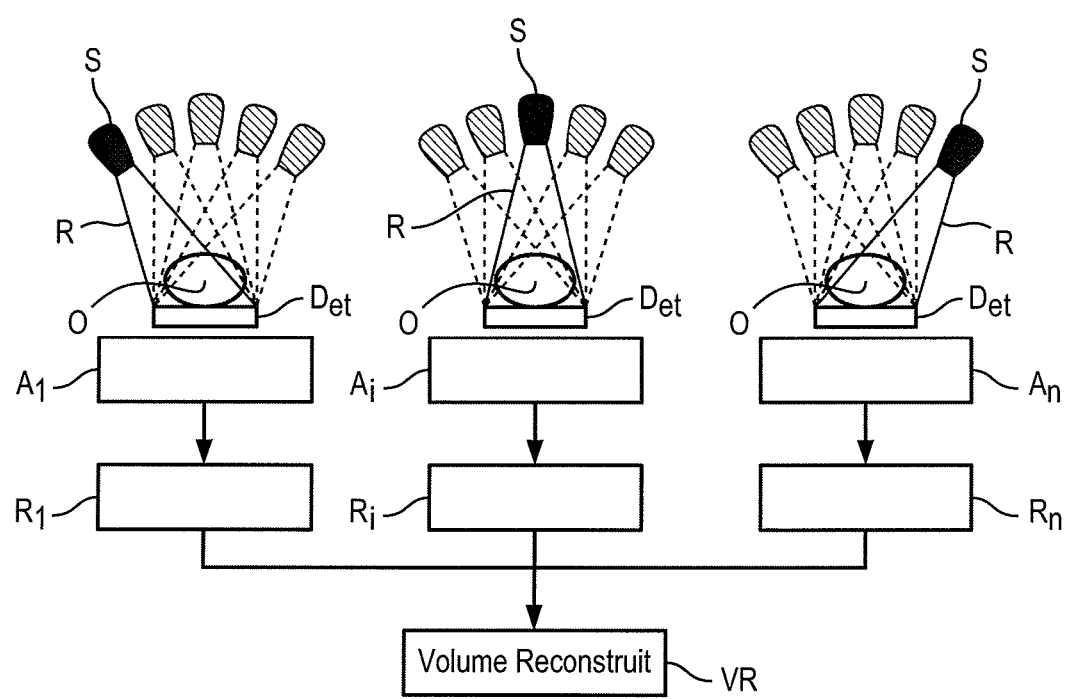
FIG. 1 schematically illustrates acquisition of 2D images of an organ and reconstruction of a 3D image of this organ by tomosynthesis.

FIG. 2 schematically illustrates a medical imaging system 1 for acquiring 2D projection images for reconstruction of a 3D image of an injured organ.

Such a system can be mammography apparatus for detection and characterisation of lesions in the case of the screening, diagnosis and treatment of breast cancer.

The medical imaging system 1 comprises an image acquisition system 3, an image processing system 5 and a display system 4.

The acquisition system 3 acquires a plurality of 2D projection images of a region of interest—an organ—of a patient. The processing system 5 is for example a computer. The processing system 5 is coupled to memory means 6 which can be integrated or separate from the processing system 5. These means can be formed by a hard drive or any other removable storage medium (CD ROM, diskette etc.).

The image acquisition system 3 is for example an acquisition system by X-rays, the latter comprising any known means for remission of X-rays to the object 2 and acquisition of resulting images.

The processing system enables both reconstruction of the 3D image and processing of images, such as to be described.

General Description of the Image Processing Method

The major consideration hereinbelow is to analyse the image of an organ of a patient for optionally detecting a lesion.

Figure 3:
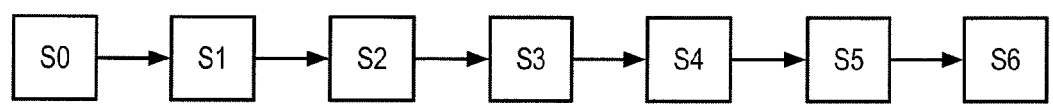
FIG. 3 schematically illustrates steps of the method according to an embodiment of the invention.

FIG. 3 schematically illustrates the steps of the image processing method. The processing method aims to process a 3D image representative of the contrast uptake of the injured organ obtained using a reconstruction method of tomographic type from a plurality of 2D projection images acquired following emission of X-rays onto a damaged organ (emission as described hereinabove).

The 3D image comprises a plurality of voxels presenting a contrast value quantifying the radio-opacity of the damaged organ.

In the case of single-energy tomosynthesis, the contrast of the object is proportional to the linear attenuation coefficient $\mu$ of the object.

And in the case of dual-energy tomosynthesis, after recombination for each projection angle of the low- and high-energy images for producing a contrast image (for example using weighted logarithmic subtraction familiar to the expert) and reconstruction of the 3D image from these recombined 2D projection images, the contrast of the object is proportional to the concentration C of the contrast medium. The injected contrast medium is for example iodine or more generally an iodine product.

The method comprises a step S0 during which a plurality of 2D projection images of the organ of a patient is acquired.

The method also comprises a step S1 during which a 3D image of the organ is reconstructed.

The method comprises a detection step S2 of an object in the reconstructed 3D image.

Detection of the object means the fact that in a given zone of the reconstructed 3D image all agglomerated voxels present a contrast value substantially different to that of the other voxels of the given zone. The agglomerated voxels constitute the detected object.

In an embodiment the 3D image is constituted by a plurality of 2D images known as cutting planes, parallel to the plane of the detector and stacked according to the z axis perpendicular to the plane of the detector, said given zone is therefore itself consists of a plurality of given 2D zones present in the cutting planes.

The object is then detected from observing, on a series of cutting planes, agglomerated pixels presenting a contrast value substantially different to that of the other pixels of the given 2D zone. The accumulation according to z of the agglomerated pixels on the series of cutting planes constitutes the detected object.

In the following description, the plane P will make reference to a plane substantially parallel to the detector and passing through the object detected.

The principle of the method rests on estimation S3 of a thickness limit T from which the contrast values of the voxels are no longer proportional to the radio-opacity of the object.

The method prevents the value of the voxels of the recombined 3D image from being degraded when the thickness of the object to be characterised is less than a thickness limit for a given object size measured in a plane parallel to the detector and which passes through the object.

Figure 4:
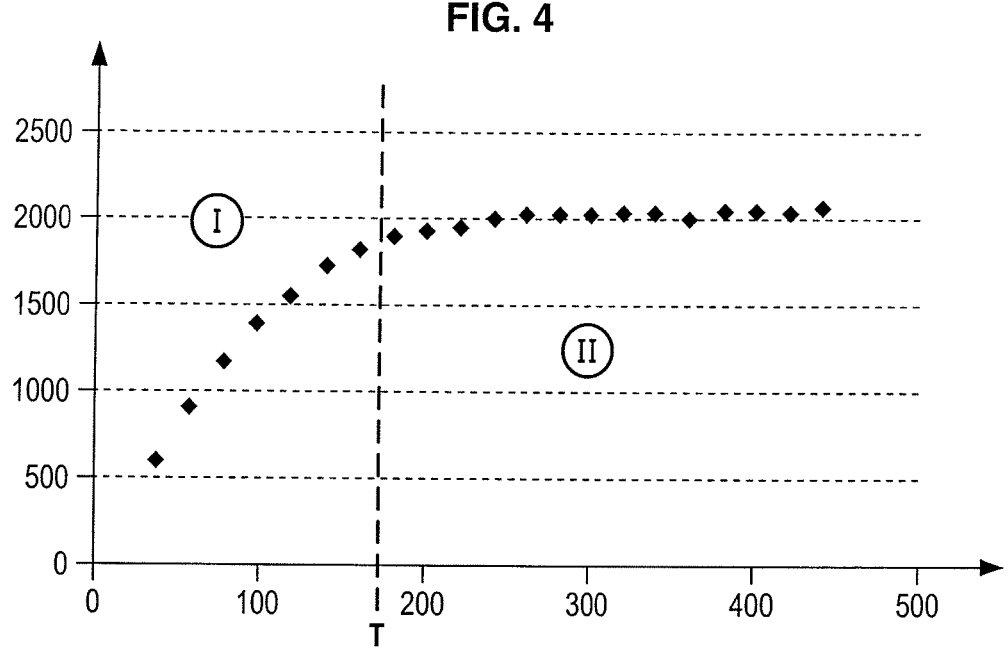
FIG. 4 illustrates the volume contrast of the object in the reconstructed image plane passing through said object as a function of the thickness of the object model.

FIG. 4 illustrates, for an object of square section of dimensions 3×3 mm in the plane P, the contrast values of the object in a plane parallel to the detector and passing through the object (for example the plane P) as a function of the thickness t of the object (expressed in tenths of a millimeter) by considering a linear attenuation coefficient constant $\mu$—characteristic of the radio-opacity of the object. More precisely, an object of parallelepiped form of square section is used in the plane P and its thickness t is varied (its dimension according to the z axis).

To obtain a curve such as illustrated in FIG. 4, for each object of given thickness t and given form, a cut is made in the reconstructed volume passing through the object (substantially perpendicular to the z axis), for example the plane P.

For given object dimensions in the plane P the contrast values can be traced as a function of the thickness t of the object.

In FIG. 4 two zones are distinguished: a non-linear zone I and a linear zone II. These two zones are on either side of a value t=T.

In particular in single-energy tomosynthesis:
in the linear zone II, the contrast of the object is proportional to the linear attenuation coefficient of the organ;
in the non-linear zone I it has been shown that the contrast is essentially proportional to $(\mu \cdot t)/T$.

It is understood that in the non-linear zone I there is an imperfect quantification of the contrast; that is to say that there is a lack of contrast. It is further understood that multiplying the contrast values in this zone by a factor K=T/t is enough to re-establish linearity.

It should be noted that in the case of dual-energy tomosynthesis the linear attenuation coefficient is to be replaced by the concentration of the contrast medium in the organ.

It is then shown in the same way that
in the linear zone II, the contrast of the object is proportional to the concentration C of the contrast medium;
in the non-linear zone I it has been shown that the contrast is essentially proportional to $(C \cdot t)/T$.

As a consequence in the method for an object of size D in the plane P the thickness $t_p$ of the object is compared S4 to the thickness limit T which depends on D, and if the thickness $t_p$ is less than the thickness limit T the values of the contrast of the object in the 3D reconstructed image are multiplied S6 by the coefficient $K_p = T/t_p$ calculated S4 (this being valid for single-energy or dual-energy tomosynthesis).

Figure 5:
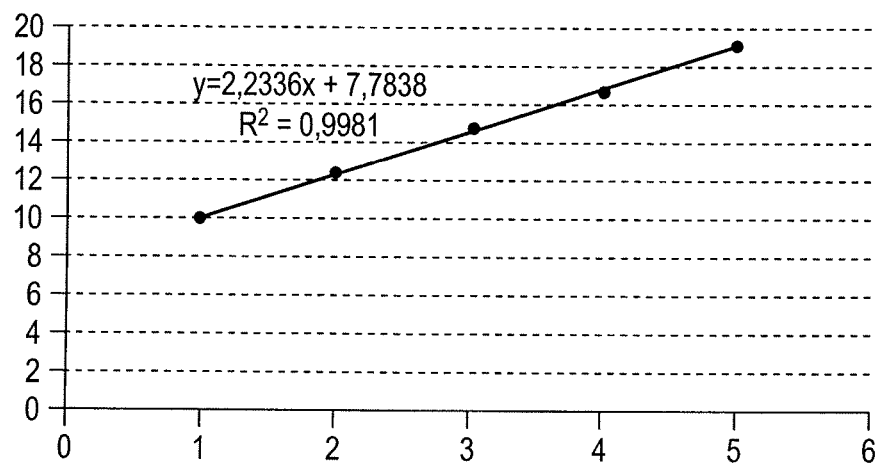
FIG. 5 illustrates the size of the lesion model in the plane of the detector as a function of the thickness limit.

FIG. 5 illustrates a linear relation between the size of the object in the plane P of the detector and the thickness limit T. Such a curve was obtained for an angular opening of between $-20°$ and $+20°$. For a given angular opening of the tomosynthesis apparatus, there is therefore proportionality relation between the size of the object in the plane P and the thickness limit T. The proportionality coefficient is stored with the angular opening to which it applies in the processing means of the medical imaging system.

Therefore, for a given angular opening, if there is capacity to estimate the size D of the object in the plane P, the thickness limit T can be deduced therefrom, allowing us to correct the contrast values. There is a need to have constructed the curve giving the contrast as a function of the thickness of the object (see FIG. 4) at least for two values of D to be able to deduce therefrom the proportionality coefficient between T and D.

So to re-establish proportionality between contrast of the voxels of the lesion and linear attenuation coefficient (or concentration of the contrast medium) it is required to estimate both S3 the thickness limit T and S4 the thickness $t_p$ of the object to be characterised.

Figure 6:
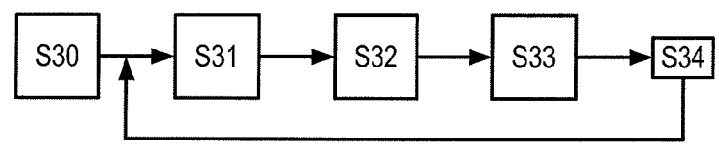
FIG. 6 schematically illustrates sub-steps of the method of the invention.

Estimation of the thickness limit T and of the thickness $t_p$ of the object to be characterised To estimate S3 the thickness limit T the object model (see FIG. 7) is initialised S30 (FIG. 6) for a given size D in the plane P.

To do this, an arbitrary hypothesis can be taken as to the form of the object: ellipsoid, or parallelepiped, for example.

The significant parameter is especially the dimension according to the z axis perpendicular to the plane of the detector: the thickness t of the object model.

Figure 7:
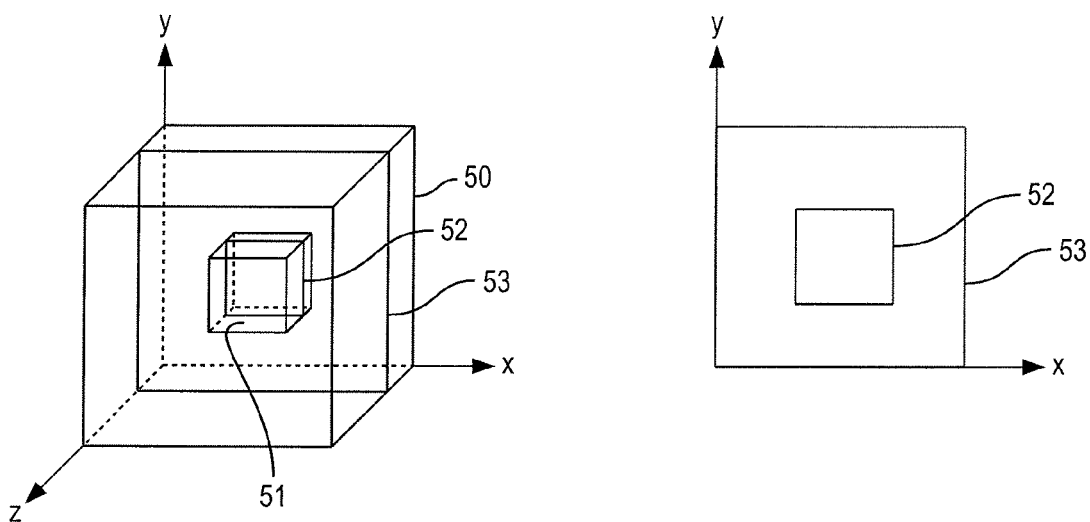
FIG. 7 illustrates the principle of estimation of the thickness limit.

FIG. 7 illustrates a theoretical model of a volume 50 containing an object model 51 of thickness t.

On this theoretical model the acquisition of a plurality of 2D projection images is simulated followed by reconstruction of 3D images in the same conditions as real conditions for radiological examination.

The result is an imperfect reconstruction of the object model, and (see FIG. 4) it is known that the voxels of the reconstructed image cannot present a contrast proportional to the radio-opacity of the object (due to the limited angular opening of the trajectory of the X-ray source around the object being imaged).

To obtain the thickness limit T the operations will be repeated S34 by each time varying the thickness t of the object vary, and each time extracting a cutting plane 53 substantially perpendicular to the z axis and passing through the object, for example the plane P.

From these cutting planes the contrast of the object can then be extracted and a curve similar to that of FIG. 4 traced, deducing therefrom the thickness limit T for a size D of the given object and the angular opening.

It is noted that this results in a network of curves for different values of the size D of the object to be stored in the processing means of the medical imaging system.

Once the thickness limit T is estimated the thickness $t_p$ of the object to be characterised is estimated.

For this purpose a device for obtaining the dimensional characteristics of the object can be used, for example with a secondary imaging system such as imagery via magnetic resonance, ultrasound etc. If for example ultrasound is used, in executing acquisition of a cutting image of the object in a plane perpendicular to the plane x, y of the detector of the tomosynthesis apparatus, it then becomes possible to measure the thickness $t_p$ of the object in this ultrasound cutting plane.

And the estimated thickness $t_p$ of the object to be characterised then helps determine the corrective factor $K_p$.

The dimensional characteristics can also be utilised to give the object model a general form which is close to the object to be characterised.

The object model can also be considered as spherical for example. In this case, measuring the size D of the object in the plane P of the detector gives us direct access to an estimation of the thickness $t_p$, with $t_p = D$.

Alternatively, if it is supposed that the object is a flattened ellipsoid according to the z axis whereof the thickness is connected to the size D in the plane P according to a ratio a, measuring the size D of the object in the plane P gives us direct access to an estimation of the thickness $t_p$, of the object, with $t_p = \alpha \cdot D$.

Thus, on the one hand due to estimation of the thickness limit T and of the thickness $t_p$ of the object the corrective factor $K_p$ can be calculated and the contrast of the object in the reconstructed image can be corrected.

The contrast of the lesion in the event where a lesion is to be characterised is correctly quantified and the information available so that the practitioner makes an improved diagnosis.

An example in the case of medical imagery has been described, though such a processing can be utilised method when the aim is to characterise a material and especially detect its defaults.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the scope of the following claims.

The invention claimed is:

1. A method for processing contrast-enhanced images obtained by a tomosynthesis apparatus, the method comprising:
    acquiring a plurality of 2D projection contrast-enhanced images of a region of interest of a patient;
    reconstructing a digital 3D image from the acquired 2D projection contrast-enhanced images;
    detecting an object in the reconstructed 3D image;
    estimating a thickness limit characteristic of a contrast default of voxels for a diameter of the object;
    estimating the thickness of the object; and
    comparing the thickness of the object to the thickness limit, wherein if the thickness of the object is less than the thickness limit, the method further comprises:
        applying at least to the voxels of the object in the reconstructed 3D image a multiplicative corrective factor equal to the ratio between the thickness limit and the thickness of the object to thus proportionally relate the thickness of the object and the thickness limit for a known geometry of the tomosynthesis apparatus.

2. The method according to claim 1, wherein the corrective factor is a function of the thickness limit from which the voxels are no longer a linear variation relative to the radio-opacity of the object detected.

3. The method according to claim 1, wherein estimating the thickness limit comprises for a given dimension of the object determination of theoretical volume of a zone of interest containing a model of the object of given thickness and form:
    calculating a model of reconstructed volume originating from the theoretical volume by reconstruction by tomosynthesis from a plurality of 2D images originating from the theoretical volume calculated;
    extracting a cutting plane intercepting the object of given thickness;
    repeating the two steps of calculation and of the extraction step for a plurality of given values of thickness; and
    determining the thickness limit from the contrast plotted for each thickness considered.

4. The method according to claim 3, wherein the model of the object is selected from among the following group: spherical, cubic or more generally ellipsoid or parallelepiped.

5. The Method according to claim 1, wherein the 2D projection contrast-enhanced images are obtained by single-energy tomosynthesis.

6. The method according to claim 1, wherein the 2D projection contrast-enhanced images are obtained by dual-energy tomosynthesis with injection of a contrast medium.

* * * * *

UNITED STATES PATENT AND TRADEMARK OFFICE
CERTIFICATE OF CORRECTION

| | | |
|---|---|---|
| PATENT NO. | : 8,798,348 B2 | Page 1 of 1 |
| APPLICATION NO. | : 12/371968 | |
| DATED | : August 5, 2014 | |
| INVENTOR(S) | : Muller et al. | |

It is certified that error appears in the above-identified patent and that said Letters Patent is hereby corrected as shown below:

In the Claims

In Column 8, Line 28, in Claim 5, delete "Method" and insert -- method --, therefor.

Signed and Sealed this
Twenty-eighth Day of April, 2015

Michelle K. Lee
*Director of the United States Patent and Trademark Office*